United States Patent
Li

(10) Patent No.: US 7,328,308 B2
(45) Date of Patent: Feb. 5, 2008

(54) DATA WRITING METHOD FOR RAID

(75) Inventor: Yong Li, Hsin-Tien (TW)

(73) Assignee: Via Technologies, Inc., Taipei (TW)

( * ) Notice: Subject to any disclaimer, the term of this patent is extended or adjusted under 35 U.S.C. 154(b) by 298 days.

(21) Appl. No.: 11/246,095

(22) Filed: Oct. 11, 2005

(65) Prior Publication Data

US 2007/0011403 A1  Jan. 11, 2007

(30) Foreign Application Priority Data

Jul. 11, 2005  (TW) .............................. 94123400 A

(51) Int. Cl.
*G06F 12/00* (2006.01)
(52) U.S. Cl. ............................ 711/114; 714/6
(58) Field of Classification Search ................ 711/114
See application file for complete search history.

(56) References Cited

U.S. PATENT DOCUMENTS 6,219,751 B1 *  4/2001  Hodges ...................... 711/114
7,062,704 B2 *  6/2006  Talagala et al. ............. 714/819
2006/0080505 A1 *  4/2006  Arai et al. .................. 711/114

* cited by examiner

*Primary Examiner*—Brian R. Peugh
*Assistant Examiner*—Hashem Farrokh
(74) *Attorney, Agent, or Firm*—Birch, Stewart, Kolasch & Birch, LLP

(57) ABSTRACT

A data writing method for RAID performs at a write cycle including a first clock and a second clock, and cooperates with a first disk, a second disk, a third disk, and a memory module. The disks store a first checking data, a second data, and a second checking data. The memory module stores the second data including a third segmented data and a fourth segmented data and the first checking data stores. First step of the method is during the first clock, writing the fourth segmented data into the second disk, reading the third segmented data from the first disk, and writing the first checking data into the third disk. Then, during the second clock, the second checking data are calculated according to the third segmented data and the fourth segmented data of the second data, and the second checking data are stored in the memory module.

19 Claims, 5 Drawing Sheets

DATA WRITING METHOD FOR RAID

BACKGROUND OF THE INVENTION

1. Field of Invention

The invention relates to a data writing method and, in particular, to a data writing method for an RAID.

2. Related Art

A hard disk (HD) is one of the most popular storage devices in the personal computer (PC). In the PC, the slow access speed of the HD slower than that of the CPU and RAM is one of the key points affecting the system speed. Recently, the servers are widely applied, and the professional audio/video (AV) system needs the storage device with large capacity and high speed. In order to speed up the flow of the computer system for enhancing the process performance, the redundant arrays of inexpensive disks (RAID) system has became the best choice.

The RAID can increase the process performance of the system by storing the data, which is divided, in different disks. Besides, according to the concept and method of parity calculation, the RAID can recover the original data stored in one failed hard disk so as to increase the data safety stored therein.

The RAID system is to simulate a logic hard disk in the system with more than two hard disks, and an RAID controller is used to simulate the various RAID prototypes according to the array types. At recent, the popular RAID prototypes are RAID 0, RAID 1, RAID 3, RAID 4, and RAID 5.

A conventional writing method for the RAID, such as RAID 5, includes the steps of dividing one data into a plurality of segmented data, storing the segmented data into the different hard disks, obtaining the parity data by an XOR logic operation of the segmented data, and writing the parity data into the hard disk. Herein, the number of the segmented data is depended on the number of the hard disks.

Therefore, the system needs three subcommands to perform the following steps during a write cycle. The first step is to write the segmented data into the hard disk. The second step is to read the segmented data to perform the logic operation. The third step is to write the parity data into the hard disk. In other words, the system needs three clocks to perform the data writing command for the RAID.

Although the conventional writing method just use three clocks to perform the data writing command for the RAID, it will waste much time when the RAID processes a large numbers of data writing commands. It is therefore an important subject to save the time for performing the writing command for the RAID to increase the efficiency of the RAID.

SUMMARY OF THE INVENTION

In view of the foregoing, the invention is to provide a data writing method for an RAID, which can save the operation time of the system.

To achieve the above, a data writing method for an RAID of the invention, which performs at a write cycle including a plurality of clocks, and cooperates with a first disk, a second disk, a third disk, and a memory module for storing a first data with a first segmented data and a second segmented data, a second data with a third segmented data and a fourth segmented data, and a first checking data, the third segmented data is stored in the first disk and the first checking data is stored in the memory module.

The data writing method of the invention includes the following steps. First, during a first clock, the fourth segmented data are written into the second disk, the third segmented data are read from the first disk, and the first checking data is written into the third disk. Then, during a second clock, the second checking data are calculated according to the third segmented data and the fourth segmented data, and the second checking data is stored in the memory module.

To achieve the above, another data writing method for an RAID of the invention, which performs at a write cycle including a plurality of clocks, and cooperates with a plurality of disks and a memory module for storing a plurality of segmented data, is disclosed. One of the segmented data is stored in a first disk, and a first checking data is stored in the memory module. The data writing method of the invention includes the following steps. First, during a first clock, other one of the segmented data is written into a second disk, and the segment data are read from the first disk. Then, during a second clock, a second checking data is calculated in accordance with the segmented data read from the first disk and the segmented data written into the second disk, and the second checking data is stored into the memory module.

As mentioned above, the data writing method for the RAID of the invention writes the data and the checking data into the disks during two clocks. In other words, the writing method of the invention can process the RAID writing command in two clocks and can save one clock with comparison to the conventional writing method. Therefore, systems or servers can save the process time to increase the operation performance when systems or servers are processing a large numbers of data.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The data writing method for a RAID of the invention will be apparent from the following detailed description.

Figure 1:
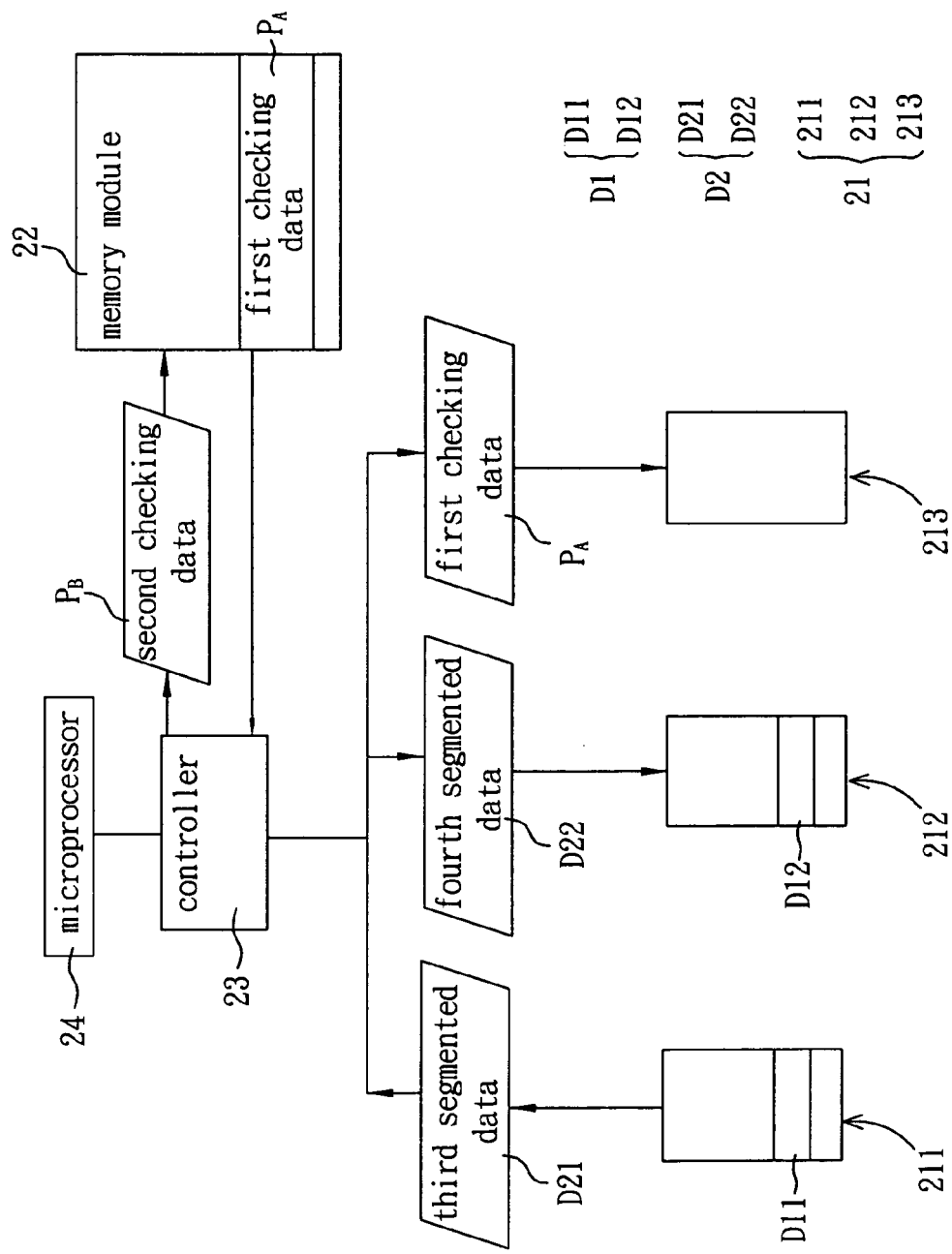
FIG. 1 is a schematic diagram showing a hardware cooperated with a data writing method for an RAID according to an embodiment of the invention.

Referring to FIG. 1, the data writing method for the RAID according to the embodiment of the invention is cooperating with a RAID 21 and a memory module 22. The RAID 21 is used to store a first data D1, a first checking data $P_A$, a second data D2, and a second checking data $P_B$. The first data D1 includes a first segmented data D11 and a second segmented data D12, and the second data D2 includes a third segmented data D21 and a fourth segmented data D22. In the embodiment, the RAID 21 is consisted of a first disk 211, a second disk 212, and a third disk 213. Certainly, the number of the segmented data divided from one data will increase with corresponding to the number of the disks.

Figure 2:
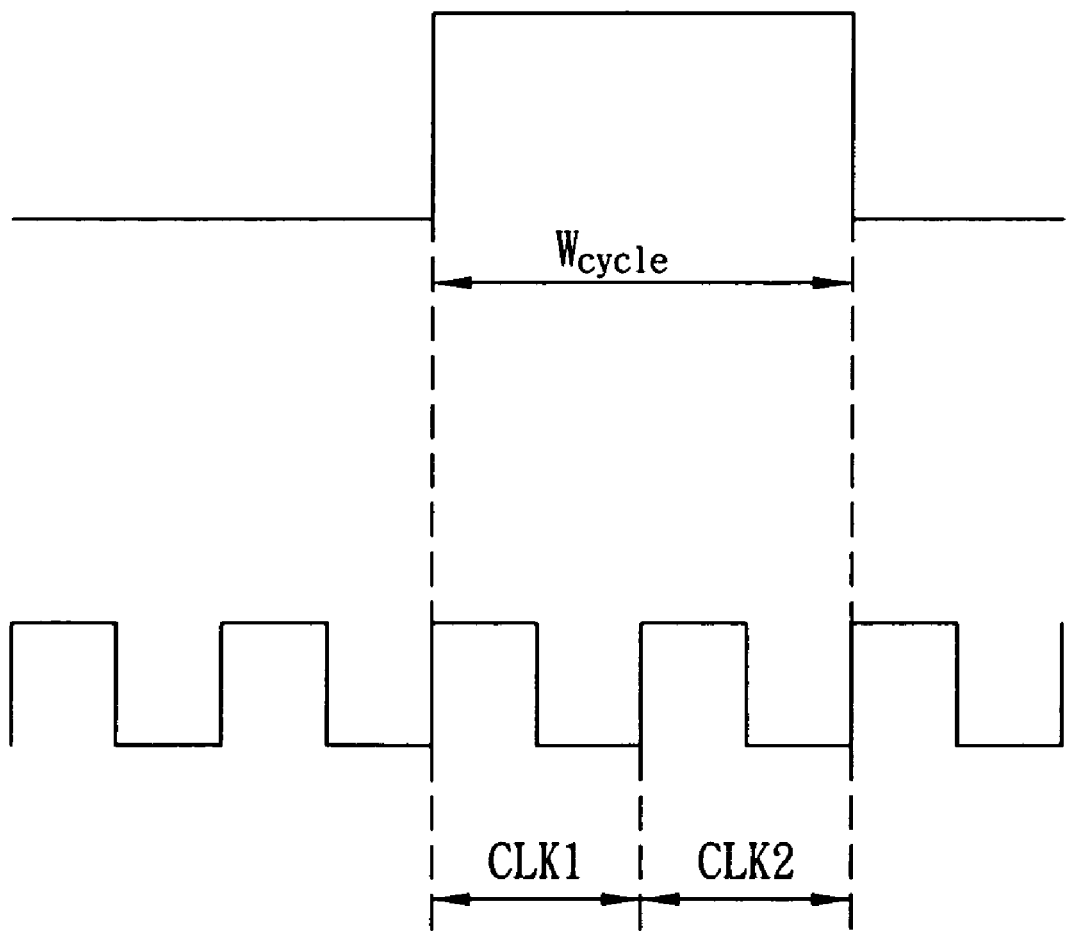
FIG. 2 is a schematic diagram showing a write cycle of the data writing method for the RAID according to the embodiment of the invention.

Referring to FIG. 2, the data writing method for the RAID according to the embodiment of the invention is to write one data and one checking data into the RAID 21 during a write cycle $W_{cycle}$ having a first clock CLK1 and a second clock CLK2.

In the embodiment, the first segmented data D11 and the second segmented data D12 is written into the first disk 211 and the second disk 212 respectively during a preceding write cycle before the write cycle $W_{cycle}$. Additionally, in the embodiment, the writing method further cooperates with a controller 23, such as a RAID controller, and a microprocessor 24, such as a central processing unit (CPU) electrically connecting to the controller 23. The controller 23 is electrically connected to the first disk 211, the second disk 212, the third disk 213, and the memory module 22. The microprocessor 24 performs a logic operation and obtains the first checking data $P_A$ by calculating the first segmented data D11 and the second segmented data D12. In the embodiment, the microprocessor 24 operates an Exclusive OR (XOR) operation to obtain the first checking data $P_A$.

Figure 3:
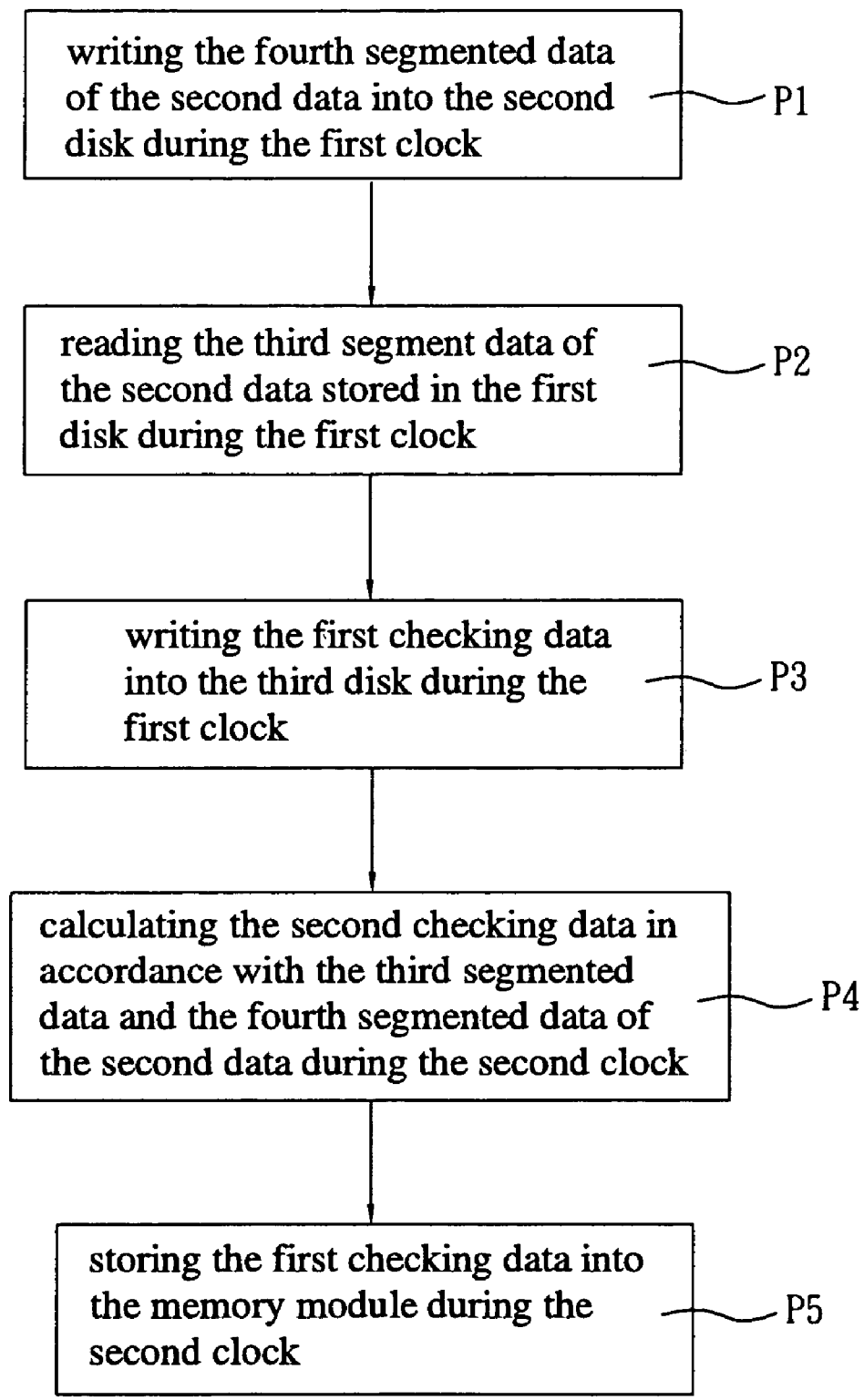
FIG. 3 is a flow chart showing the data writing method for the RAID according to the embodiment of the invention.

Referring to FIG. 3 and FIG. 1, the data writing method for the RAID according to the embodiment of the invention includes the following steps. Herein, for instance, the third segmented data D21 is stored in the first disk 211 and the first checking data $P_A$ is stored in the memory module 22.

First, the procedure P1 is to write the fourth segmented data D22 into the second disk 212 during the first clock CLK1 of the write cycle $W_{cycle}$.

Then, the procedure P2 is to read the third segmented data D21 from the first disk 211 during the first clock CLK1. In the embodiment, the third segmented data D21 are read and transferred to the microprocessor 24 by the controller 23.

After that, the procedure P3 is to write the first checking data $P_A$ into the third disk 213 during the first clock CLK1.

In the current embodiment, the steps of writing the fourth segmented data D22, reading the third segmented data D21, and writing the first checking data $P_A$ are finished with corresponding to a writing-reading command during the first clock CLK1.

Then, in the procedure P4, the second checking data $P_B$ is calculated according to the third segmented data D21 and the fourth segmented data D22 during the second clock CLK2. In the embodiment, the microprocessor 24 obtains the second checking data $P_B$ by operating the XOR operation in accordance with the third segmented data D21 and the fourth segmented data D22.

Finally, the procedure P5 is to store the second checking data $P_B$ in the memory module 22. Consequently, the system can finish the data writing procedure. In this case, the second checking data $P_B$ will be written into the RAID 21 together with one next data during the next write cycle after the write cycle $W_{cycle}$.

Figure 4A:
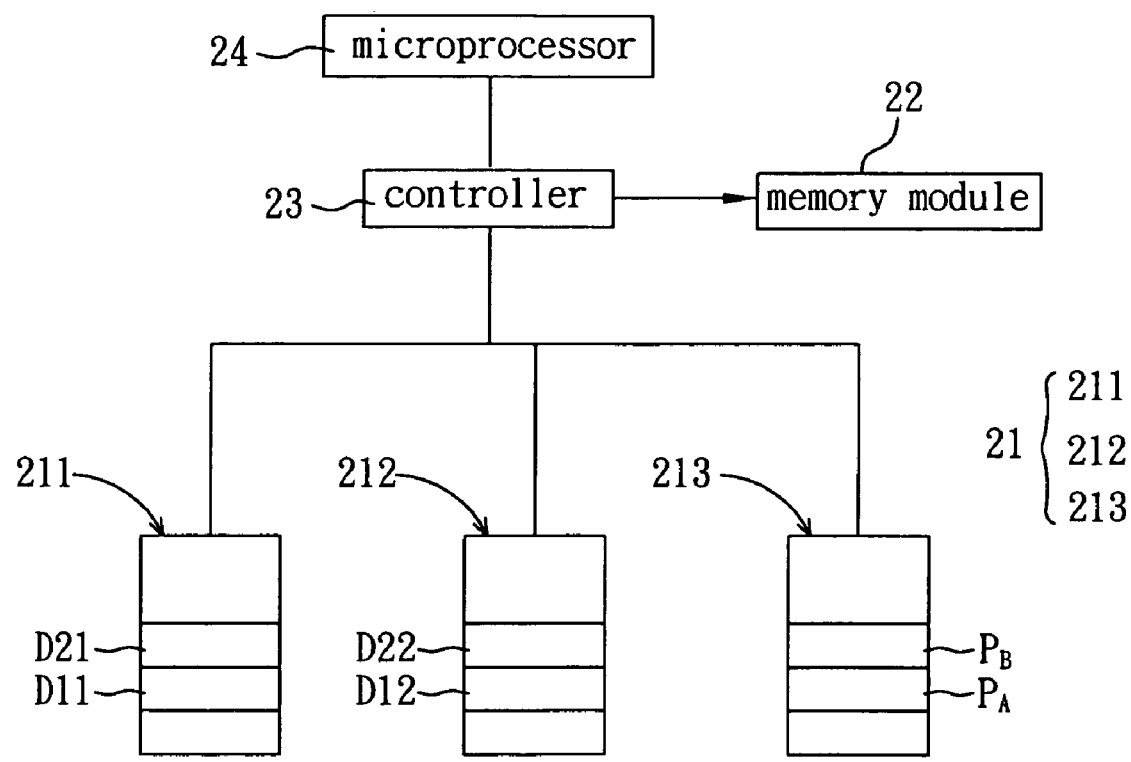
FIG. 4A and FIG. 4B are schematic diagrams showing the data writing method for the RAID according to the embodiment of the invention applied in different RAID specs.
Figure 4B:
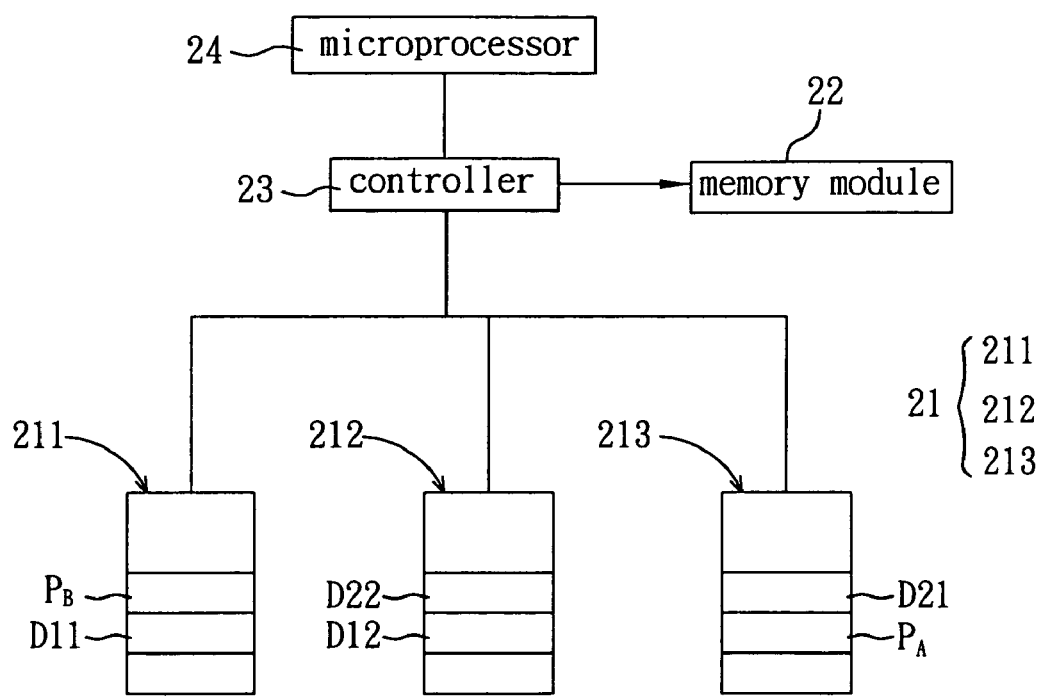

Referring to FIG. 4A, in the embodiment, the system can be applied to an RAID 3 or an RAID 4 when the third disk 213 is a checking data disk and the second checking data $P_B$ is written into the third disk 213 (the first checking data $P_A$ and the second checking data $P_B$ are stored in the same disk). With reference to FIG. 4B, the system can also be applied to an RAID 5 when the second checking data $P_B$ is written into the first disk 211 or the second disk 212 (the first checking data $P_A$ and the second checking data $P_B$ are stored in the different disk).

In the embodiment, the first checking data $P_A$ calculated by the first data D1 (the data of the preceding write cycle) is written into the RAID 21, and the second checking data $P_B$ calculated by the second data D2 is stored in the memory module 22 during the write cycle $W_{cycle}$. Then, the second checking data $P_B$ is written into the RAID 21 during the next write cycle. As mentioned above, the memory module 22 still stores one checking data after the regular write cycles. In order to ensure the data completeness, the checking data have to be written into the RAID 21 before the system is turned off.

In summary, the data writing method for the RAID of the invention, which is different from the conventional writing method, is to write the data and the checking data calculated by the previous data into the RAID within only two clocks. Therefore, the data writing method of the invention can reduce one clock in every write cycle so as to save the data processing time and to increase the operation performance of the system or server. Although the system or the server have to take an extra clock to write the latest checking data into the RAID before the system or the server is turned off, time saved from the write cycles is much obvious especially for the system or the server having large data flow.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A data writing method for an RAID performed at a write cycle including a plurality of clocks, and cooperating with a first disk, a second disk, a third disk, and a memory module for storing a first data with a first segmented data and a second segmented data, a second data with a third segmented data and a fourth segmented data, and a first checking data, the third segmented data is stored in the first disk, and the first checking data is stored in the memory module, the writing method comprising:

writing the fourth segmented data into the second disk during a first clock;
   reading the third segment data stored in the first disk during the first clock;
   writing the first checking data into the third disk during the first clock;
   calculating the second checking data in accordance with the third segmented data and the fourth segmented data during a second clock; and
   storing the second checking data into the memory module during the second clock.

2. The writing method according to claim 1, wherein the third disk is a checking data disk.

3. The writing method according to claim 2, wherein the second checking data is written into the third disk.

4. The writing method according to claim 2, which is applied to an RAID 3.

5. The writing method according to claim 2, which is applied to an RAID 4.

6. The writing method according to claim 1, wherein the second checking data is written into one of the first disk or the second disk.

7. The writing method according to claim 6, which is applied to an RAID 5.

8. The writing method according to claim 1, further comprising:

performing a logic operation to obtain the second checking data with a microprocessor in accordance with the third segmented data and the fourth segmented data of the second data.

9. The writing method according to claim 8, wherein the logic operation is an Exclusive OR operation.

10. The writing method according to claim 1, wherein the first checking data is obtained by calculating the first segmented data and the second segmented data of the first data.

11. The writing method according to claim 1, wherein the first checking data is a parity data.

12. The writing method according to claim 1, wherein the second checking data is a parity data.

13. A data writing method for an RAID performed at a write cycle including a plurality of clocks, and cooperating with a plurality of disks and a memory module for storing a plurality of segmented data, one of the segmented data is stored in a first disk, and a first checking data is stored in the memory module, the writing method comprising:

writing other one of the segmented data into a second disk during a first clock;
 reading the segment data stored in the first disk during the first cock;
 calculating a second checking data in accordance with the segmented data read from the first disk and the segmented data written into the second disk during a second clock; and
 storing the second checking data into the memory module during the second clock.

14. The writing method according to claim 13, wherein the second checking data is written into a third disk.

15. The writing method according to claim 14, wherein the third disk is a checking data disk.

16. The writing method according to claim 13, wherein the second checking data is written into one of the first disk or the second disk.

17. The writing method according to claim 13, further comprising:

performing a logic operation to obtain the second checking data with a microprocessor in accordance with the third segmented data and the fourth segmented data of the second data.

18. The writing method according to claim 17, wherein the logic operation is an Exclusive OR operation.

19. The writing method according to claim 13, wherein the second checking data is a parity data.

* * * * *